United States Patent [19]
Moreau

[11] Patent Number: 6,061,791
[45] Date of Patent: May 9, 2000

[54] INITIAL SECRET KEY ESTABLISHMENT INCLUDING FACILITIES FOR VERIFICATION OF IDENTITY

[75] Inventor: Thierry Moreau, Montreal, Canada

[73] Assignee: Connotech Experts-Conseils Inc., Montreal, Canada

[21] Appl. No.: 09/296,378

[22] Filed: Apr. 22, 1999

Related U.S. Application Data

[60] Provisional application No. 60/046,047, May 9, 1997.

[30] Foreign Application Priority Data

May 7, 1998 [WO] WIPO ............... PCT/CA98/00431

[51] Int. Cl.[7] ........................................... H04L 9/08
[52] U.S. Cl. ............................. 713/171; 380/283
[58] Field of Search .................... 380/283, 285; 713/168, 169, 171

[56] References Cited

U.S. PATENT DOCUMENTS

| | | |
|---|---|---|
| 4,200,770 | 4/1980 | Hellmann et al. . |
| 4,405,829 | 9/1983 | Rivest et al. . |
| 4,771,461 | 9/1988 | Matyas . |
| 5,020,105 | 5/1991 | Rosen et al. . |
| 5,142,578 | 8/1992 | Matyas et al. . |
| 5,179,591 | 1/1993 | Hardy et al. ............................ 380/21 |
| 5,216,715 | 6/1993 | Markwitz . |
| 5,288,978 | 2/1994 | Iijima ...................................... 235/380 |

(List continued on next page.)

FOREIGN PATENT DOCUMENTS

| | | |
|---|---|---|
| 2156780 | 8/1995 | Canada . |
| 2177622 | 5/1996 | Canada . |

OTHER PUBLICATIONS

Telecommunications Industry Associations "Over–the–Air Service Provisioning of Mobile Stations in Wideband Spread Spectrum Systems"—TIA/EIA/IS–683, Feb. 1997, pp. 1–B2.

(List continued on next page.)

*Primary Examiner*—Gilberto Barron, Jr.
*Assistant Examiner*—Anthony DiLorenzo
*Attorney, Agent, or Firm*—James Anglehart; Swabey, Ogilvy, Renault

[57] ABSTRACT

An issuer offers any type of service secured with a secret cryptographic key assigned to an applicant according to the present invention, which includes a secret key registration process. Usually, the secret key will be loaded on a portable memory device or other secret key store of the applicant. As preliminary steps, the issuer sets up its public key for the Probabilistic Encryption Key Exchange (PEKE) cryptosystem, and the applicant obtains a copy of a secret key registration software, a copy of the issuer's public key, and an uninitialized portable memory device. Once initiated by the applicant, the registration software generates an internal PEKE secret key. The applicant chooses a registration pass query and pass reply that the registration software MACs and encrypts with a key derived from the PEKE secret key. The registration software derives the key assigned to the applicant from the PEKE secret key, and loads it into the secret key store. A message is sent to the issuer data processing center where the cryptographic processing (PEKE, MAC, encryption) is reversed. Using an alternate channel (e.g. telephone conversation) an issuer agent verifies the identity of the applicanô: the agent asks the pass query, the applicant replies with the pass reply, and the issuer verifies the applicant's knowledge of some relevant personal data. The issuer agent can approve the applicant's registration in the issuer database. There is no need for the issuer to personalize either the software or the secret key store before delivery to the applicant, and there is a single personal contact between the applicant and the issuer agent.

15 Claims, 3 Drawing Sheets

U.S. PATENT DOCUMENTS

| | | |
|---|---|---|
| 5,375,159 | 12/1994 | Scheidt et al. . |
| 5,386,468 | 1/1995 | Akiyama et al. . |
| 5,535,276 | 7/1996 | Ganesan ................................... 380/25 |
| 5,539,824 | 7/1996 | Bjorklund et al. . |
| 5,557,679 | 9/1996 | Julin et al. . |
| 5,583,939 | 12/1996 | Chang et al. . |
| 5,680,458 | 10/1997 | Spelman et al. . |
| 5,745,571 | 4/1998 | Zuk . |
| 5,748,739 | 5/1998 | Press ........................................ 380/25 |
| 5,768,373 | 6/1998 | Lohstroh et al. .......................... 380/4 |
| 5,784,463 | 7/1998 | Chen et al. . |
| 5,875,394 | 2/1999 | Daly et al. ............................. 455/411 |

OTHER PUBLICATIONS

Telecommunications Industry Associations "Over–the–Air Service Provisioning", publication version Jun. 19, 1997, Source TIA TR–45.2 9Cheryl Blum (Lucent Technologies)pp. 1–14.

Anderson, Ross J.: Liability and Computer Security: Nine Principles, in Computer Security–Esorics 94, $3^{rd}$ European Symposium on Research in Computer Sec. Nov. 1994, LNCS (Lecture Notes in Computer Sc.) 875, Springer Verlag, pp. 231–245.

Abadi, Martin, Needham, Roger, Prudent Engineering Practice for Cryptographic Protocole, in 1994, IEEE Symposium on Research in Security and Privacy, IEEE, 1994, pp. 122–136.

Anderson, Ross J, and Needham, Roger, Robutness Principles for Public Key Protocols, in Advances in Cryptology, Crypto'95, LNCS (Lecture Notes in Computer Sc)963, Springer Verlag, pp. 236–247.

Accredited Standards Committee X9–Financial Services (ANSI ASC X()Working Draft ANSI X9.30–199x Public Key Cryptography Usin Irreversible Algorithms for the Financial Services Industry: Part 3: Certificate Management for DSA, Americal Bankers Association, Washington, DC, Nov. 19, 1994, (document N24–94).

EFTA,Electronic Fund Transfer Act, Title IX of the Customer Credit Protection Act, 15 U.S.C. §1601 et seq.).

Regulation E: Electronic Fund Transfers, (12 C.F.R. §205).

Harn, Lein, Digital SIgnature for Diffie–Hellman Keys without using a one–way function, Electronics Letters, $16^{th}$ Jan. 1997, vol. 33, No. 2, pp. 125–126.

Moreau, Thierry, Probabilistic Encryption Key Exchange, Electronics Letters, vol. 31, No. 25, $7^{th}$ Dec., pp. 2166–2168.

Moreau, Thierry, Automated Data Protection for telecommunications, Electronic Transactions and Messaging using PEKE secret key exchange and Other Cryptographic Algorithms, Technology Licensing Opportunity, revision 1.1, Connotech Experts–Conseils Inc., Montreal, Canada 1996.

Blum, Manuel et al."An efficient Probabilistic Public–Key Encryption Scheme which Hides All Partial Information", in Advances in Cryptology: Proceedings of Crypto'84, Springer–Verlag, 1985, pp–289–299.

Montgomery, Peter L."Modular Multiplication Without Trial Division" Mathematics of Computations, vol. 44, No. 170, Apr. 1985, pp. 519–522.

Dussé,Stephen R. et al. "A Cryptographic Library for the Motorola DSP56000, Advances in Cryptology, Eurocrypt'90, Lecture Notes In Computer Science No. 473, pp. 230–233, Springer–Verlag, 1990.

Eldridge, S.W. et al, Hardware Implementation of Montgomery's Modular Multiplication Algorithm, IEEE Transactions on Computers, vol. 46, No. 6, Jun. 1993, pp. 693–699.

INITIAL SECRET KEY ESTABLISHMENT INCLUDING FACILITIES FOR VERIFICATION OF IDENTITY

The present application claims priority of U.S. provisional patent application Ser. No. 60/046,047 filed May 9, 1997, and of PCT/CA97/00431 filed May 7, 1998, designating the United States and now pending in the international phase.

FIELD OF THE INVENTION

The present invention generally relates to cryptographic key management that is required for the implementation of secure data communications or transaction processing. More specifically, it addresses the need to establish, or renew (e.g. after security breach), the very first shared secret key between two parties (e.g. a client and a financial institution in an on-line banking service arrangement). This registration process encompasses human activities by the parties' agents for the verification of identity. The present invention facilitates these human activities by a novel and unique arrangement of automated operations, notably cryptographic transformations. The present invention also relates to the secure loading of cryptographic key material in hand held memories in the form of smart cards, security tokens, and the like. Although the present invention uses public key cryptography primitives, it does not assist the establishment of a private/public key pair of the type used for digital signatures or public key encryption. The present invention does not deal with the derivation of a session key or a one-time password from either a preset shared secret key, or a preset secret password.

BACKGROUND OF THE INVENTION

For the deployment of electronic commerce and on-line banking services, information security techniques are of paramount importance. As will be seen from the prior art cited hereafter, they are also important for the protection of computer networks and the authentication of subscribers of mobile telephone service. A general scheme emerges for the organization of such electronic authentication applications, despite the diversified vocabulary used in different application areas. There is first a central database under the operational control of a service organization whose trustworthiness is commensurate with the issues at stake. Then, there are the potential clients, individuals or organizations. The general function of a registration process is to make a given client known by the service organization in such a way that the subsequent routine processing of transactions is automated and efficient. The clients have access to electronic apparatus through which they conduct their ordinary activities. A registration process provides the client with secret authentication information. This secret can be a Personal Identification Number (PIN), a private key for a digital signature algorithm, or a secret cryptographic key shared between the client and the service organization. While a PIN can be remembered by a normal person, the two other forms of authentication secret require a digital memory of some sort. The present invention is mainly concerned with the registration process when a shared secret authentication key is used.

Ultimately, transaction authentication is effective if it secures the legal tie or bind between a bank account withdrawal and the account holder's liability, while barring access to the funds by defrauders. Since the account holder is a legal person rather than a digital apparatus, the required chain of evidence is a two-tiered authentication bind: 1) the logical bind between the account holder (or the account holder agent) and a cryptographic operation performed by a digital apparatus, and 2) the bind between this said cryptographic operation and the transaction historic records of the financial institution. Within its scope of a registration process, the present invention addresses these two aspects of transaction authentication.

The distinction between "secret key cryptography" and "public key cryptography" is well known in the prior art. In the present disclosure, we reserve the term "secret" to data shared in confidence between parties in a secret key cryptography arrangement, and respectively the terms "private" and "public" to the private and public components of a private/public key pair of the type used for digital signatures or public key encryption from the field of public key cryptography.

The elementary cryptographic operation used in transaction authentication can be DES encryption of a secret Personal Identification Number (PIN) entered at a Point of Sale terminal (POS terminal), with cryptographic integrity protection applied to the whole transaction (typically with a Message Authentication Code based on DES and a secret key). In that case, a long-term secret key has to be established initially between the POS terminal and the data processing center responsible for transactions initiated from this POS terminal (normally under the control of the merchant's financial institution). This long-term secret key is of the type that can be established with the present invention. U.S. Pat. No. 4,771,461 discloses a procedure for this secret key establishment.

This prior art of U.S. Pat. No. 4,771,461 suffers from a number of intrinsic limitations. First and foremost, there is the following explicit security weakness (column 16 lines 1 to 6): "The general exposure of the procedure is that an opponent can always initiate a successful sign-on from his location with his terminal, provided that the real terminal never signs on before T2 and does not report this to the KDC [Key Distribution Center]. In that case, the fake terminal can continue to operate indefinitely."

More generally, the procedure of U.S. Pat. No. 4,771,461 appears outdated when one considers the level of sophistication reached by adversaries of actual cryptosystems. See for instance the article by Ross J. Anderson, *Liability and Computer Security: Nine Principles* (in Computer Security—Esorics '94, Third European Symposium on Research in Computer Security, November 1994, LNCS 875, Springer Verlag, PP 231–245), the article by Martin Abadi, and Roger Needham, *Prudent Engineering Practice for Cryptographic Protocols* (in 1994 IEEE Symposium on Research in Security and Privacy, IEEE, 1994, PP 122–136), and the article by Ross J. Anderson, and Roger Needham, *Robustness Principles for Public Key Protocols* (in Advances in Cryptology, CRYPTO'95, LNCS 963, Springer Verlag, 1995, PP 236–247). Nonetheless, U.S. Pat. No. 4,771,461 has the merit of stressing the importance of data integrity protection for the initial establishment of cryptographic keys.

There are also operational limitations in the procedure of U.S. Pat. No. 4,771,461. Despite the acknowledgment that courier services for secret key distribution are expensive and burdensome, it is not clear how courier services can be avoided altogether. They may be required because the POS terminals can be loaded with a terminal identifier and/or a public key at a central location. Courier services or another form of alternate secure channel may also be required for some instructions to a person because these instructions may contain sensitive information specific to each POS terminal. Moreover, the explicit operational delays introduced by this prior art have a negative impact on the value of the procedures.

The U.S. Pat. No. 5,784,463 uses public key cryptography to establish some long term cryptographic keys in a manner analogue to U.S. Pat. No. 4,771,461, but it lacks facilities for verification of identity such as the time windows in U.S. Pat. No. 4,771,461. In other words, the U.S. Pat. No. 5,784,463 embeds no procedural countermeasure against the threat of theft of identity. Without any such countermeasure, a would-be defrauder simply needs the electronic version of identification information needed for registration in order to attempt an impersonation attack.

The U.S. Pat. No. 5,216,715 on lines 14 to 18 on column 5 (and on lines 16 to 23 on column 6) refers to a known procedural protection used for remote user authentication at the outset of a telephone call, just after some session key establishment protocol, that is the verbal confirmation that some check value agree on both ends of the telephone call. The assurance provided by this procedural authentication step is valid for the duration of the telephone call only. For a security system to be as unintrusive as possible, routine operations such as a telephone call setup should use fully automated security mechanisms; procedural steps should be used sparingly, e.g. to the initial registration of legitimate users of the system. Indeed, the procedural step for remote telephone operator identification as in U.S. Pat. No. 5,216,715 is typical of very high security telephone sets. In addition, the procedural verification of identity in U.S. Pat. No. 5,216,715 does not work if the call is established with a voice mailbox.

In the field of wireless subscriber registration, the U.S. Pat. No. 5,077,790 discloses a procedure based on the establishment of a "key code" that is a secret key shared between a portable telephone and the network controller. Upon verification of the applicant's credit, an help desk agent provides a "link identification number" that binds the credit approval to the subsequent download of the definitive "subscriber identification number", this download being cryptographically protected with the initial "keycode". This procedure is inconvenient due to the manual operations involved in the establishment of the "key code" and might be vulnerable to eavesdropping because every security critical information is transmitted over the air and while no public key cryptography is involved.

In many cases, security systems features create more inconvenience to the users than effective protection. This is the case in the U.S. Pat. No. 5,386,468 that discloses an electronic identification registration procedure where the typing of user application information on a communication terminal keyboard is duplicated by filling a user application form and mailing it. This duplicate work is inconvenient because the paper processing actually delays the reply in the query/reply protocol used for registration. One can assume that U.S. Pat. No. 5,386,468 is practiced without the procedural step (paper processing) for which no clear purpose is disclosed. In any event, the key management burden in the manufacturing and distribution of terminals is significantly higher in U.S. Pat. No. 5,386,468 than in U.S. Pat. No. 4,771,461.

The elementary cryptographic operation used in transaction authentication can also be a digital signature from the field of public key cryptography, in which case a representative description of the prior art may be found in the Working Draft ANSI standard X9.30-199x *Public Key Cryptography Using Irreversible Algorithms for the Financial Services Industry: Part 3: Certificate Management for DSA* (by the Accredited Standards Committee X9-Financial Services, ANSI ASC X9, American Bankers Association, Washington, D.C., Nov. 19, 1994 document N24-94). The present invention alleviates the traditional burden of secret key distribution, and thus suggests the avoidance of the public key infrastructure described in the mentioned Working Draft ANSI standard X9.30-199x. Indeed, the financial industry has been operating on a centralized trust model for decades, and the adoption of public key paradigms may be expected to remain low.

Turning now to the logical bind between the account holder (or the account holder agent) and a cryptographic operation performed by a digital apparatus, one way to let the account holder control the use of a cryptographic key is to store it on a hand held memory device in credit card format, or in a format suitable for attachment on a key ring, or any other small size format. Thus, the account holder is relieved from the obligation to control the access to a fixed apparatus like a computer system, or a luggage-size apparatus like a portable personal computer. When the hand-held memory device contains intrinsic data access control features, it falls into the smart card category. This usually requires a rudimentary microprocessor along with the memory device. With further sophistication, a hand held electronic device may embed sufficient processing power and/or memory to be perform complete cryptographic operations. In the latter case, the security is enhanced by avoiding the threat of malignant software modifications. The present invention facilitates the establishment of the secret key to be loaded on hand held devices where the prior art required the use of centralized key loading facilities, and/or secure transmission of secret keys using trusted courier services. The present invention may allow the avoidance of centralized smart card personalization operation.

The centralized trust model typical of the financial industry is assumed by the United States regulatory environment for consumer protection in the case of electronic fund transfers. The field of the present invention is more specifically covered by EFTA, *Electronic Fund Transfer Act*, Title IX of the Customer Credit Protection Act, (15 U.S.C. §1601 et seq.) and *Regulation E. Electronic Fund Transfers*, (12 C.F.R. §205) Section 205.5 which deals with the issuance of access devices used for customer-initiated EFT. In some circumstances and according to these rules, a secret key (established with the help of cryptographic protocols) may fall under the legal definition of an access device. In such a case, a verification of the customer identity is prescribed as a condition for the final validation of the secret key for EFT transactions. An object of the present invention is to facilitate the issuance (of access devices) complying with the EFTA Regulation E or similar rules.

A difficulty with key management methods that require centralized configuration or personalization is the implied restrictions on the channels of distribution. For consumer electronics, computer products, and software devoid of security functions, a myriad of channels are possible: catalog sales, retail stores, large discounters, and the like, the list being endless. If an item (like an access device for an EFT service) has to be prepared for a specific customer by trusted personnel according to procedures dictated by a financial institution, the possible channels of distribution are very few, if any, besides courier shipment by the financial institution. U.S. Pat. No. 5,557,679 is an attempt to use retail outlets for the distribution of subscriber identity modules (portable memories used for mobile telephone subscriber authentication). The present invention broadens the choices of acceptable channels of distribution for authentication devices.

In U.S. Pat. No. 5,557,679, secret keys are pre-established to secure a network of retail locations where the key loading operation is performed. There is no capability for the fully distributed scenario where the target electronic devices are remotely located from any (already) secured system. Secret key schemes that avoid the use of courier services in a fully distributed scenario are conceivable if the target electronic devices are already loaded with a common, fixed key "hidden by being included in the [device] programmable read only memory (PROM) at manufacturing level", as in U.S. Pat. No. 5,539,824. Such a scheme is generally considered not so secure, except perhaps when offered by a very reputable supplier.

The famous Diffie-Hellman cryptosystem described in U.S. Pat. 4,200,770, and the recent similar proposals found in U.S. Pat. Nos. 5,583,939 and 5,375,169 do not provide remote party authentication and secret key freshness simultaneously. Indeed the "public key" of a Diffie-Hellman exchange is usually considered a short-lived cryptographic value, and the authentication potential of the Diffie-Hellman exchange is not used. For instance, U.S. Pat. No. 5,020,105 applies Diffie-Hellman to the task of establishing a secret authentication key, but does not provide facilities for verification of account holder identity. Moreover, the processing load implied by the original Diffie-Hellman cryptosystem is large, while the security of U.S. Pat. Nos. 5,583,939 and 5,375,169 is questionable or uncertain. The recent article by Lein Ham, *Digital signature for Diffie-Hellman keys without using a one-way function* (in Electronics Letters, Jan. 16, 1997, Vol. 33, No. 2, pp. 25–126) discloses a noteworthy attempt at enhancing the Diffie-Hellman scheme with authentication properties.

It is logical that the disclosure in U.S. Pat. No. 4,771,461 stresses the need for data integrity in the key loading operation, and at the same time uses a public key cryptosystem, RSA, with a long-term public key assigned to the financial institution. This public key participates in the authentication of the financial institution to the benefit of the client-side of the secret key establishment. The security of this prior art depends on the unpredictability of the random number source on the client-side. The use of random sources for cryptographic key material has been recognized as a potential source of security flaws.

Any scheme where the client-side of the session key establishment already has a long term public key is likely to address a need different from the present invention, based on the premises of public key cryptography. U.S. Pat. No. 5,406,628 may be a good example.

Last, but not least, is the disclosure by the present Applicant, of the Probabilistic Encryption Key Exchange (PEKE) cryptosystem in Canadian patent application 2,156,780 (entitled Apparatus and Method for Cryptographic System Users to Obtain a Jointly Determined, Secret, Shared, and Unique Bit String, filed on Aug. 23, 1995, laid-open to the public on Sep. 23, 1995), in an article by Thierry Moreau, Probabilistic Encryption Key Exchange (in Electronics Letters, Vol. 31, number 25, Dec. 17, 1995, pp 2166–2168), and in a technical report by Thierry Moreau, *Automated Data Protection for Telecommunications, Electronic Transactions and Messaging using PEKE Secret Key Exchange and Other Cryptographic Algorithms, Technology Licensing Opportunity* (revision 1.1, CONNOTECH Experts-Conseils Inc., Montreal, Canada, March 1996, with legal deposits in the National Library of Canada, where it was not available to the public before April 1997, and in the National Library of Québec, where it was made available to the public some time between November 1996 and January 1997). The PEKE cryptosystem is based on the Blum-Goldwasser probabilistic encryption scheme explained in an article by Manuel Blum and Shafi Goldwasser, *An Efficient Probabilistic Public-key Encryption Scheme which Hides All Partial Information* (in Advances in Cryptology: Proceedings of Crypto'84, Springer-Verlag, 1985, pp 289–299). The PEKE cryptosystem has been disclosed so far for session key establishment with no facilities for the verification of identity. Indeed, transaction authentication using PEKE is suggested in the mentioned technical report by Thierry Moreau, but using a preset shared secret password as the basis for authentication, and PEKE for session key establishment. For the present invention, the PEKE cryptosystem is one of three alternate cryptosystems, the other two being conventional public key encryption (e.g. RSA, in U.S. Pat. No. 4,405,829), and the Lein Harn's improvement to the Diffie-Hellman key exchange in the mentioned article by Lein Harn.

The commonly used public key cryptosystems use arithmetic operations on large integers and especially the modulus (the remainder of an integer division). To make these computations relatively efficient, the use of the Montgomery modulo reduction algorithm is relatively known in the prior art, see the original article by Peter L. Montgomery, *Modular Multiplication Without Trial Division* (in Mathemetics of computations, Vol. 44, no. 170, April 1985, pp 519–522). Two implementations are disclosed in the article by Stephen R. Dusse and Burton S. Kaliski Jr.,*A Cryptographic Library for the Motorola DSP56000* (in Advances in Cryptology, Eurocrypt'90, Lecture Notes In Computer Science no. 473, pp 230–244, Springer-Verlag, 1990) and in the article by S. E. Eldridge and Colin D. Walter, *Hardware Implementation of Montgomery's Modular Multiplication Algorithm* (in IEEE Transactions on Computers, Vol. 46, no. 6, June 1993, pp 693–699). These two detailed accounts of the Montgomery algorithm implementation are targeted, respectively, at digital signal processors with peculiar instruction sets, and at dedicated integrated circuit design. Adaptations of this prior art are useful when the Montgomery algorithm is implemented on a general purpose digital processor.

SUMMARY OF THE INVENTION

According to the present invention, there is an "issuer", that is a service organization that registers "applicants". For the issuer, it is reasonable and economically justified to maintain a computerized "database" of its customers, account holders, clients or subscribers, where this database contains sensitive information, and to train personnel, or "issuer agents", to provide customer services with a relevant degree of integrity and loyalty. The issuer database is secured using the known art of data processing security where a single organization may exert effective control of the system security. Typically, this will include cryptographic processing capabilities closely associated with the database in such a way that secret keys are not accessible to issuer personnel. At the same time, the issuer agents are typically provided with relevant customer data needed to respond to specific customer requests. The issuer agents typically access this data on a need-to-know basis through on-line terminals with controlled access to software functions, and with auditing to deter or sanction frauds that agents might conceive or commit.

The present invention is an improved method for the establishment of a secret key shared in confidence between a digital memory possessed by an applicant and the issuer database, where no prior secret is available from which the desired secret key could be derived. The present invention may obviously be used to establish a secret key when a choice is made to ignore any prior secret, e.g. due to a suspected security breach.

The following table shows the preliminary steps needed for the present invention. The issuer arranges his own private/public key pair for a Public Key Cryptosystem (PKC) that is later used, in any number of secret key establishment instances, to protect a message transmission from the applicant's digital processor to the issuer data processing center where the issuer's private key may be used. At least three PKCs are acceptable: 1) conventional public key encryption, 2) the PEKE cryptosystem, and 3) the Lein Ham's improvement to the Diffie-Hellman key exchange. Each PKC has intrinsic properties that can lead to variations of the present invention.

| Issuer | Distributor | Applicant |
| --- | --- | --- |
| Set up private/ public key pair | | |
| Package public key with application software | Distribute software | Obtain application software |
| | Distribute hardware | Obtain portable memory device |

The issuer also prepares some application software that embeds an "applicant registration program" and a copy of the issuer's public key. The applicant obtains a copy of this application software from any type of distribution channel because there is no customization required at this stage. The applicant also obtains a portable memory device if the secret key is to be stored on such a device, again from any type of distribution channel.

In an instance of secret key establishment, under the control of the applicant, the application registration program is executed by a digital processor. See the following table. This program generates a secret key, preferably not arbitrarily but starting with one or more arbitrary numbers and then applying transformations mandated by the PKC in use and taking into account the issuer's public key, the said transformations preferably taking into account a first message according to the cryptosystem in use and issued by or on behalf of the issuer. When the PKC in use is conventional public key encryption, there is no first message. When the PKC in use is PEKE, the first message is the PEKE initiator's message and it may be issued by or on behalf of the issuer. When the PKC in use is the Lein Harn's improvement to the Diffie-Hellman key exchange, the first message must be issued by the issuer because it requires knowledge of the issuer's private key, and the transformations further include the abortion of the process upon the failure of a digital signature verification.

| Portable memory device | Applicant | Applicant's digital processor | Issuer data processing center |
| --- | --- | --- | --- |
| | Start applicant registration program | Preferably receive message according to cryptosystem in use | |
| | | Generate a secrete key, variant-dependent rules | |
| Receive secret key | | Load secret key into portable memory device | |
| | Type secret pass query and pass reply | Seal and encrypt e.g. using issuer public key | |
| | | Send message | Receive message Decrypt and check, store secret key, pass query, and pass reply |

Once generated, part or all of this secret key is loaded into the portable memory device, if any, otherwise into a convenient digital memory area. Alternatively, it may be displayed to the applicant in human-readable form, in which case the applicant would presumably load this key into a separate apparatus having its own memory.

Another function of the applicant registration program is to accept secret inputs chosen by the applicant and typed on a keyboard. The secret inputs preferably include a pass query. The secret inputs include a pass reply. According to the spirit of the present invention, the applicant should be instructed not to disclose the pass reply to anyone but to an issuer agent who preferably would first pronounce the pass query.

The main role of the PKC in use is to provide protections for 1) the generated secret key, 2) preferably the pass query, 3) the pass reply, and 4) optionally other data, during their transmission to the issuer data processing center. A PKC alone cannot conveniently provide all the required protections. Accordingly, a hybrid public/secret key cryptosystem is needed. The details of this arrangement are influenced by the specific PKC in use in any embodiment of the present invention. The result of the hybrid public/secret key cryptosystem is put in a second message sent to the issuer data processing center.

At the issuer data processing center, the second message is received and then the algorithms used for protection are reversed, notably using the issuer's private key. Upon failure of any verification, the process is aborted. Then the applicant's record in the issuer database is expanded to include 1) part or all of the generated secret key, 2) preferably the pass query, and 3) the pass reply.

From then on, an issuer agent may be assigned the task of communicating with the applicant to verify the applicant's identity. See the following table. This communication should be two-way simultaneous like a telephone conversation or a personal visit to a branch of the issuer. The issuer data processing facilities display, or otherwise make available in human understandable form, the information relevant to the verification of the applicant's identity, namely some identification data, preferably the pass query, and the pass reply. During this conversation, preferably the issuer agent pronounces the pass query, allowing the applicant to recognize the agent as being authorized to verify his identity. Then, the applicant should pronounce the pass reply, while the issuer agent listens and verifies the pass reply. During this conversation, the issuer agent generally verifies the applicant's identity. The data processing facilities provide the agent with an input mechanism, e.g. an input field on a computer screen, to enter the final acceptance or rejection of the registration. This causes a change in the status of the secret key in the issuer database. The pass query and pass reply are not intended for further use after this verification of identity.

| Issuer data processing center | Issuer agent | Applicant |
|---|---|---|
| Communicate applicant's data | Establish realtime, 2-way contact | Establish realtime, 2-way contact |
| Communicate pass query and pass reply | Pronounce pass query | Listen and verify query |
| | Listen and verify reply | Pronounce pass reply |
| | Verify applicant's identity | Answer questions |
| Validate secrete key registration | Accept applicant's identity | |

Generally speaking, the present invention assists the development of mutual recognition relationships between the applicant and the issuer. Thus, an account of the trust relationships through the recommended use of the invention may help its understanding.

In a preferred embodiment of the present invention, the chain of recognition relationships starts with the applicant receiving some software (e.g. in the form of an on-line banking software package, or in the form of firmware within an electronic wallet) that he may recognize as genuinely endorsed by the issuer, and that contains the public key of the issuer stored with proprietary or semi-proprietary data integrity algorithm. Stated differently, the applicant believes that some software package or security device is not bogus, presumably because of its look and feel. What he believes genuine contains the public key of the issuer. Some obscure method is used by what-he-believes-genuine to make sure no defrauder pasted his own public key in place of the issuer's public key.

When the applicant starts the applicant program, a new secret key is generated locally. Also, the applicant's program gets input, from the applicant, for two secret phrases used only for registration purposes, namely a "pass query" (e.g. "Where did my father look when he was at the boarding school?") and a "pass reply" (e.g. "My first car was brown and rusty."), both of them being protected, along with the newly generated secret key. The issuer's public key is used as the starting point of the protection mechanism. The result is sent as the digital message from the applicant's digital processor to the issuer's data processing facilities. By keeping secret the pass query and pass reply, the applicant gets assurance that the first person who can thereafter pronounce them is an issuer agent; this level of assurance being proportional to the applicant's trust in the issuer's operational integrity. The applicant should be given clear instructions to reveal the pass reply only to someone who just pronounced the pass query.

Upon receipt of the digital message from the applicant by the issuer, the issuer program may be executed within the issuer data processing facilities, where the private counterpart of the issuer's public key is available. As a result of the issuer program execution, the applicant record in the issuer database is updated with a fresh, yet to be validated secret key registration, and the pass query and pass reply. As yet another result of the issuer program execution, an issuer agent may, at any time thereafter, be assigned the task of validating the applicant's identity with a personal conversation.

During the conversation between the applicant and an issuer agent according to the present invention, the present invention provides the issuer agent with the applicant information needed for the verification of identity, namely personal descriptive data (e.g. mother's maiden name and state of birth), pass query, and pass reply. The issuer agent should pronounce the pass query to the person he is speaking with, wait for this person to pronounce the pass reply. In case this verification fails, the present invention provides the issuer with means to flag the registration as being void. The issuer agent should give rapid warning to the legitimate applicant since in these circumstances an impostor could impersonate a user agent for this applicant. In the normal case where the pass reply verification is successful, and assuming that the applicant did not reveal the pass reply to anyone, the issuer agent is assured that the person he is speaking with is the one w ho entered the pass query and reply when the applicant's secret key was generated. Then the issuer agent should check that this person knows, without unusual hesitation or imprecision, the descriptive data about the applicant. This is the verification of identity that binds the applicant to the shared secret key established with the cryptographic protocol. If the verification of identity is successful, the issuer agent is assured that the person he is speaking with is indeed the applicant for who the secret key registration was awaiting validation in the issuer's database. The present invention thus provides the issuer agent with means to flag the secret key registration as being accepted or validated. It is an object of the present invention to offer a remote secret key initialization and loading protocol with sensible identity verification procedures. It is yet another object of the present invention to provide enhanced security in view of the subtleties of attacks to cryptographic protocols and algorithms. It is yet another object of the present invention to provide cost-effective customer registration procedures for the delivery of electronic transactions based on a secret authentication key. It is yet another object of the present invention to provide customer registration procedures facilitating the use of alternate channels for the distribution of devices used for authentication.

BRIEF DESCRIPTION OF THE DRAWINGS

The present invention will be better understood by way of the following detailed description of the invention with reference to the appended drawings, in which.

DETAILED DESCRIPTION OF THE INVENTION

Some operations required by the present invention are performed by digital processors. Such operations are hereafter called "controlled computer operation" but are nonetheless considered as acts of either the applicant or the issuer. In practice, these operations are performed by a computer or other electronic apparatus under the control of either the applicant or the issuer. The degree of effective control on any computer operation may influence the security of the whole secret key establishment method as someone knowledgeable in the field of information system security will appreciate from the following description.

The inputs and outputs of controlled computer operations are often stored in digital memories. Then, again, uninterrupted possession and/or control over the use of these digital memories may influence the security of the whole secret key establishment method. When a digital memory is physically protected against unauthorized reading or modification, it becomes a "physically secure memory".

It is well known in the field of cryptography and information security how a legitimate user reverses a given cryptographic function from the knowledge of the appropriate keys. Thus, the disclosure of the present invention does not require the same level of detail for the reversal of a cryptographic function as for the function itself.

A public key cryptosystem (PKC) is at the heart of the proposed secret key establishment method. There are three possible PKC's, namely 1) any Public Key Encryption (PK-Encr) schemes, 2) the Probabilistic Encryption Key Exchange (PEKE), and 3) the Diffie-Hellman scheme as improved by Lein Harn (DH-Harn). For the PK-Encr case, the prior art is mature for a number of practical alternatives, notably RSA. For PEKE and DH-Harn, the prior art needs some precision for use in the present invention. PEKE is used in the preferred embodiment; provisions are made to exploit its efficiency as a public key cryptosystem for the applicant. The following "PKC specification table" portrays the use of each PKC in the present invention. For PK-Encr, the RSA cryptosystem is used as an example in the PKC specification table. For PEKE and DH-Harn, the PKC specification table and the rest of the narrative specification are mutually agreeing. The mathematical notation for each PKC is independent from each other (e.g. the symbol "e" for PEKE bears no relation to the symbol number "e" for DH-Harn). As with most public key cryptosystems, all computations are made with integer arithmetic, and often with very large operands. The usual known art of algorithmic number theory is implied. The symbol "|" represents concatenation of k-bit strings, and tacitly specifies a conversion from integer to bit string. Any of the following symbols should be read as if it was a one-letter symbol: $x_{A \to B}$, $x_B$, alpha, beta, mu, and nu.

TABLE 4

The PKC specification table.

|  | RSA (PK-Encr) | PEKE | DH-Harn |
|---|---|---|---|
| Public key | $N = P \times Q$, e | $N = P \times Q$ | $y = a^x \bmod p$ |
| Private key | P, Q, d, where P and Q are large random primes, and $d \times e \bmod (P-1)(Q-1) = 1$ | P, Q, where P and Q are large random primes congruent to 3 modulo 4 (note 1) | random x, $x < p$ |
| Other Parameters | none | S, C, k, t, where $0 < C \times S < N$, $k < \ln(N)/\ln(2)$ | p, a, where p is a large prime number and a is a "generator" |
| First message | none | random $x_{A \to B}$, where $x_{A \to B} < C$ | r, s, where $r = a^k \bmod p$ from private random k, s from signature equation (note 5) |
| Verification of first message | n/a | none | Signature verification equation (note 5) |
| Internal secret key | Secret random number k | $w = B_0|B_1|\ldots|B_{t-1}$, from secret random $x_{B_i}$, where $x_{B_i} < N/C$ (note 2) | $r^e \bmod p$, from private random e |
| Length of internal key | $< \ln(N)/\ln(2)$ | $k \times t$ | $\ln(p)/\ln(2)$ |
| Second message | $c = k^e \bmod N$ | $x_t$ | $f = a^e \bmod p$ |
| Verification of second message | none | (note 3) | none |
| Recovery of internal secret key | $k = c^d \bmod N$ | $w = B_0|B_1|\ldots|B_{t-1}$, from secret e, (note 4) | $f^k \bmod p$ |

Note 1: Preferably perform the pre-computation of integers a and b such that $a \times P + b \times Q = 1$, and alpha $= ((P + 1)/4)^{(t+1)} \bmod (P - 1)$, and beta $= ((Q + 1)/4)^{(t+1)} \bmod (Q - 1)$.
Note 2: Compute $x = (x_B - (x_B \bmod S)) \times C + x_{A \to B} \times S + (x_B \bmod S)$, $x_0 = x^2 \bmod N$, $x_{i+1} = x_i^2 \bmod N$, where i runs from 0 to t − 1, and $B_i = x_i \bmod 2^k$, where i runs from 0 to t −1.
Note 3: Compute mu $= (xt \bmod P)^{alpha} \bmod P$, nu $= (xt \bmod Q)^{beta} \bmod Q$, $e = (b \times Q \times mu + a \times P \times nu) \bmod N$, $f = (b \times Q \times (P - mu) + a \times P \times nu) \bmod N$, $g = (b \times Q \times mu + a \times P \times (Q - nu)) \bmod N$, $h = (b \times Q \times (P - mu) + a \times P \times (Q - nu)) \bmod N$, and then verify that one of e, f, g, or h satisfies $x_{A \to B} \times S = (? \bmod (S \times C)) - (? \bmod S)$.
Note 4: Compute $x_0 = e^2 \bmod N$, $x_{i+1} = x_i^2 \bmod N$, where i runs from 0 to t−1, and $B_i = x_i \bmod 2^k$, where i runs from 0 to t − 1.
Note 5: Lein Harn proposes four possible equation pairs for signature generation/verification, as indicated below:

|  | Signature Generation | Signature Verification |
|---|---|---|
| (1) | $r \times x = k + s \bmod (p-1)$ | $y^r = r \times a^s \bmod p$ |
| (2) | $s \times x = k + r \bmod (p-1))$ | $y^s = r \times a^r \bmod p$ |
| (3) | $x = r \times k + s \bmod (p-1)$ | $y = r^r \times a^s \bmod p$ |
| (4) | $x = s \times k + r \bmod (p-1)$ | $y = r^s \times a^r \bmod p$ |

Figure 1:
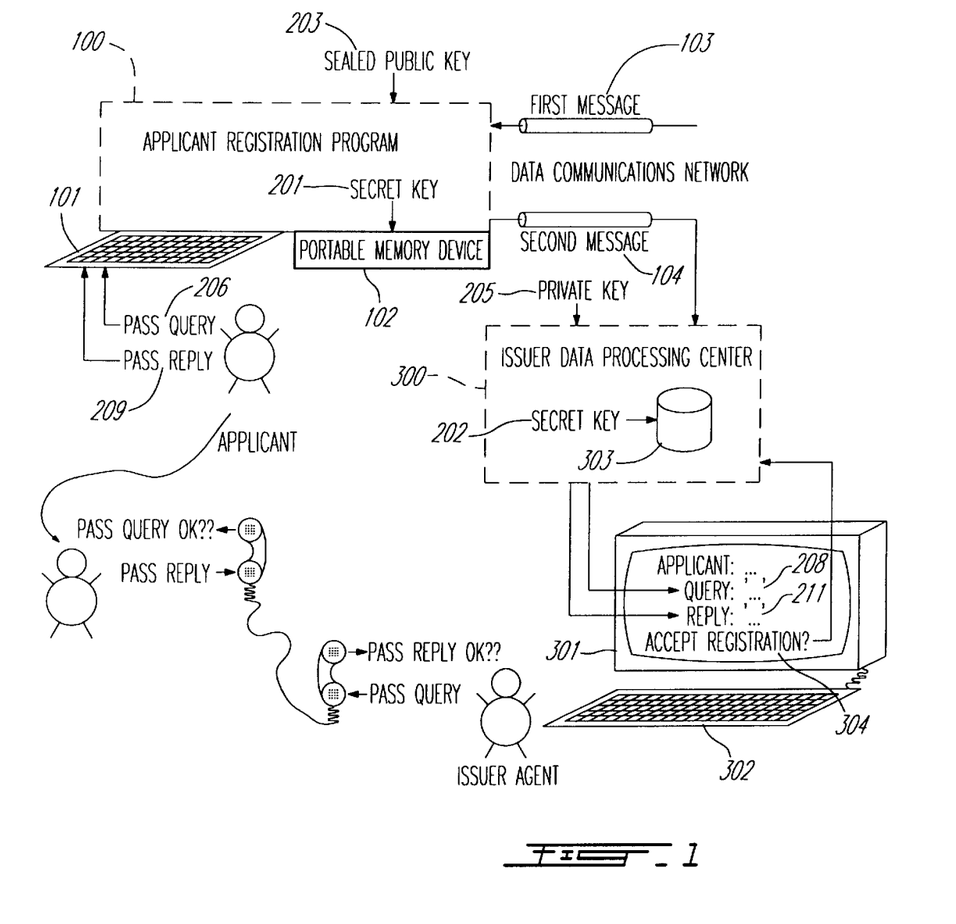
FIG. 1 is an overview block diagram illustrating the secret key establishment method and system according to the present invention.
Figure 3:
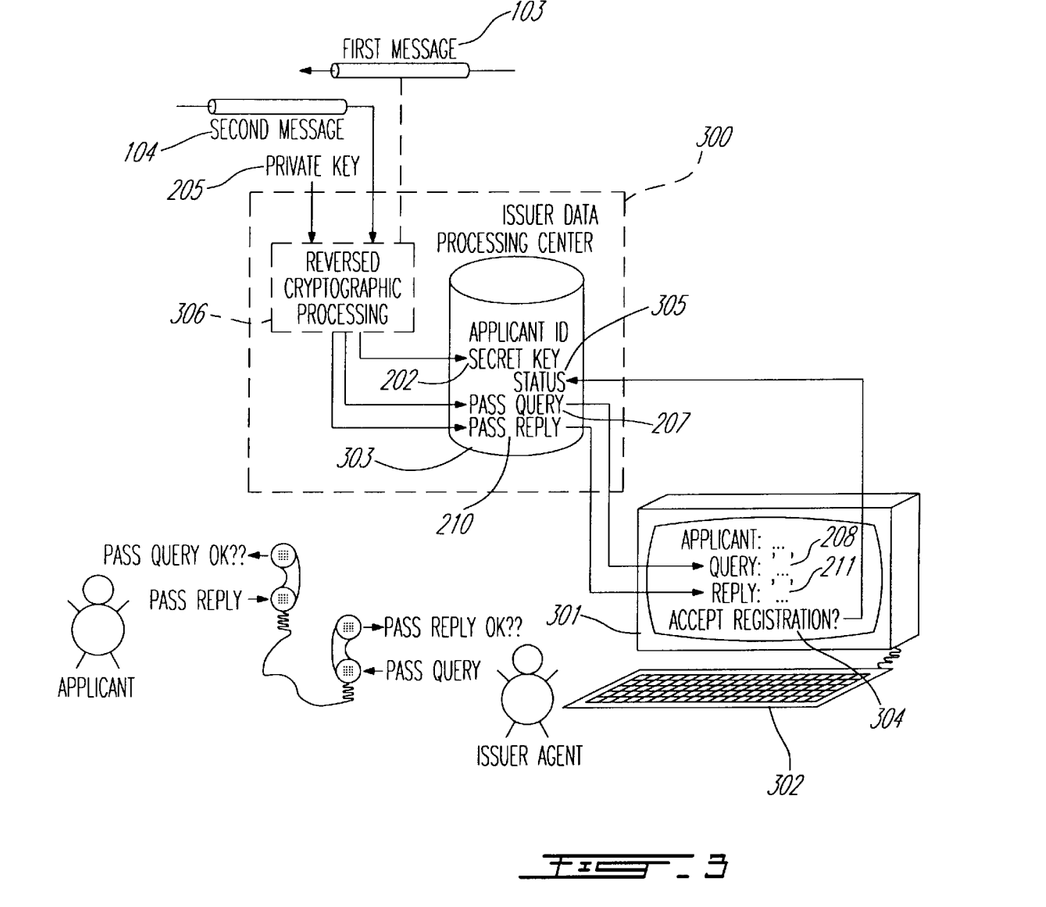
FIG. 3 is a detailed block diagram illustrating the reversed cryptographic processing done in the issuer data processing center according to the present invention, and the facilities provided by the present invention for verification of identity.

In the preparation for later secret key establishment instances, the issuer gets a private/public key pair for itself, according to the PKC in use. See the PKC specification table under the row headings "Public key" and "Private key". This is a controlled computer operation. The issuer makes the issuer private key 205 available in the issuer data processing center 300 with the usual security precautions to prevent disclosure or unauthorized use.

Still in the preparation for later secret key establishment instances, the issuer prepares a set of parameters to be used in controlled computer operations by the applicant. In all cases, the issuer public key is part of this set of parameters. This set of parameters also includes the elements listed under the under the row heading "Other parameters" in the PKC specification table. This set of parameters may also include identification data for the issuer, like the electronic mail address where the secret key registration should be sent.

Figure 2:
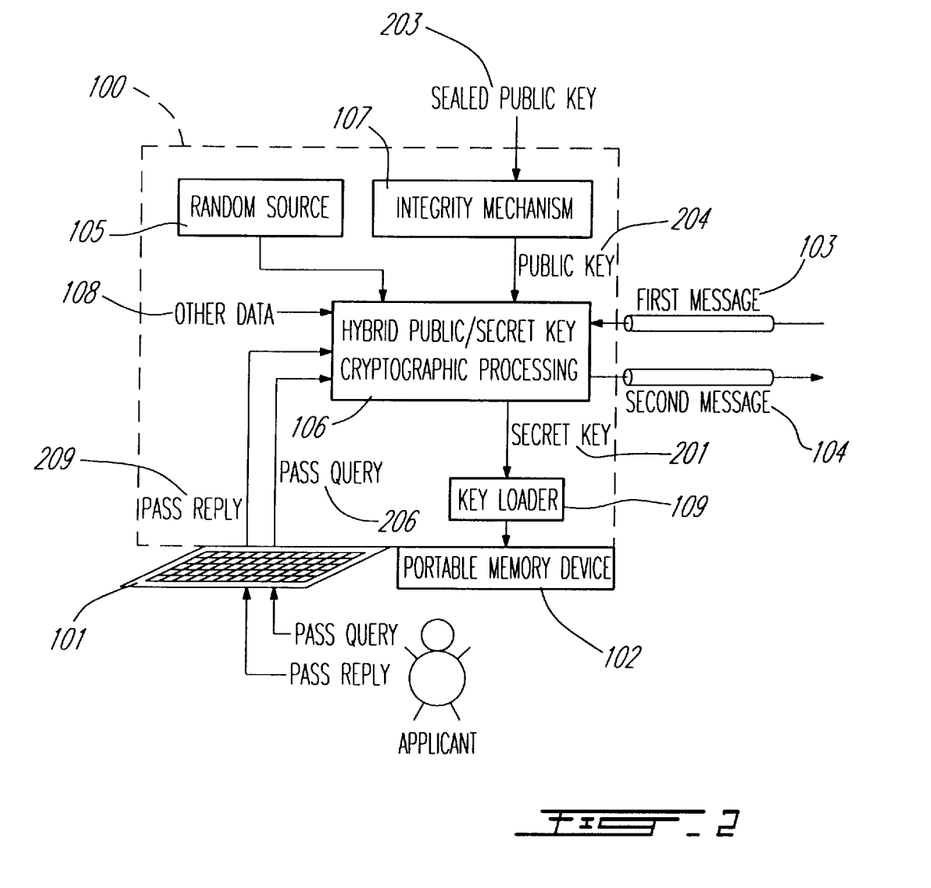
FIG. 2 is a detailed block diagram illustating the applicant registration program according to the present invention.

In the preferred embodiment, this set of parameters includes additional data for the PEKE cryptosystem intended to reduce the computation load for the controlled computer operations by the applicant. This includes the numbers S and C, but the numbers S and C could be part of the first message 103 instead. Still in the preparation for later secret key establishment instances, the issuer preferably transforms this set of parameters, where this transformation includes controlled computer operations that protect the integrity of part or all of this set of parameters, and at least the issuer public key. In the preferred embodiment, the mentioned transformation is encryption and scaling with a Frogbit semi-proprietary algorithm using a secret key of the issuer. The Frogbit semi-proprietary algorithm is specified in Canadian Patent Application Serial No. 2,177,622 published on Nov. 30, 1997. The transformation may use other proprietary schemes. Alternatively, the transformation may include affixing a digital signature generated with a private key for digital signature. This private key for digital signature is either the issuer's, or a certification authority's, and correspondingly the digital signature generation is a controlled computer operation respectively by the issuer, or by this certification authority. As is known from the prior art, a chain of security certificates may be used, in which case security certificates may be an integral part of the result of the transformation. Note that with digital signatures, the Frogbit or a proprietary algorithm may still be used to protect the integrity of a certification authority public key. Whenever the mentioned transformation is used, its result is shown as "sealed public key" 203 in the figures. Still in the preparation for later secret key establishment instances, the issuer prepares an executable computer program comprising at least the applicant registration program 100. If the mentioned transformation was not used, the applicant registration program 100 is compatible with the set of parameters. If the mentioned transformation was used, the applicant registration program 100 is compatible with the sealed public key 203 and it includes the integrity mechanism 107 that is the programmed reversal of the transformation. If the transformation uses Frogbit semi-proprietary algorithm or other proprietary algorithm, the preparation of this executable program is a controlled computer operation by the issuer because a secret algorithm and a secret key of the issuer must be embedded in the executable program. In the preferred embodiment, the executable program comprises substantially more application code than just the application registration program 100, so its look and feel would be difficult to reproduce by a defrauder. The executable program may be embedded in an electronic apparatus like a POS terminal instead of being run by a general purpose computer. In the preferred embodiment, the executable program is run by a general purpose computer and the sealed public key 203 is stored in a computer file separate from the executable file.

In preparation for later secret key establishment instances, the applicant has or obtains a copy of an executable program comprising the applicant registration program 100, a copy of the sealed public key 203, and a portable memory device 102. These items may take several forms, and may be combined depending on the variations of the invention. The "portable" memory device 102 is any memory suitable for a given application, including a plurality of memories if key-splitting is used. In the preferred embodiment, the portable memory device is any very simple small memory device which can be temporarily connected to a personal computer using an inexpensive connector, for example the Dallas Semiconductor DS1992 1K-Bit Touch Memory "button", featuring 1024 bits of non-volatile read/write memory plus a 48 bit unique read-only serial number, in a coin-size metal casing that can be attached to a key ring. The reader/connector is part number DS9092GT which connects the Touch Memory to a serial port of the personal computer.

Some variants of the secret key establishment process use a first message 103. This is mainly dependent on the PKC in use. See the PKC specification table under the row heading "First message". When a first message 103 is used, its generation is the first step of an instance of secret key establishment. With the DH-Harn cryptosystem, a first message 103 is used and its generation is a controlled computer operation by the issuer because the knowledge of the issuer private key is required. With the PEKE cryptosystem, there is a first message 103 that may be generated by the issuer or by another party. With the preferred embodiment, the first message 103 is generated by the issuer or by another party, but not by the applicant. With the PK-Encr cryptosystem, there is no first message 103. With PEKE, the first message 103 may include the numbers S and C if they were not included in the set of parameters as in the case of the preferred embodiment. When PEKE is used in the present invention, the generation of first message 103 may be assigned to the applicant registration program 100, in which case there is obviously no transmission of the first message 103 to the applicant registration program 100.

If PEKE is used in the present invention and if the generation of the first message 103 is not done by the issuer, the issuer must somehow receive its contents. One possible arrangement is to let the applicant registration program 100 include the contents of the first message 103 in the second message 104. This is done in the preferred embodiment, in which case the generating party affixes reference numbers to first messages 103 and keeps a log of the first messages 103. This allows the issuer to audit the generation of first messages 103. The rationale behind the use of a first message 103 is related to subtle weaknesses in cryptographic protocols and their implementations. For instance, if the issuer does not trust the applicant's processor random source 105, PK-Encr should be avoided. With DH-Harn, a passive eavesdropper to the secret key exchange could notice a failure of the applicant's processor random source where the random output would turn out to be constant among a number of instances of secret key exchange. With PEKE, this is not an issue. The issuer may use discipline in the way first messages 103 are generated to ensure absolute uniqueness or freshness of the secret key generated by instances of the secret key exchange. For uniqueness, the issuer should tag each first message 103 with a serial number and make sure any serial number is used only once. For freshness, the issuer should keep a record of creation times for first messages 103 and reject older ones. In the preferred embodiment, the applicant registration program 100 is trusted to timely request a first message 103 on each instance of secret key exchange, and to discard it once used. Also in the preferred embodiment, a system with a trusted random source may generate first messages 103; and no specific tracking of first messages 103 is needed. With PEKE, the presence of the number $x_{A \to B}$ protects the issuer against "chosen ciphertext attacks" known in the prior art, even if the generation of first message 103 is not done by the issuer. The present invention may be practiced with the first message 103 being prepared upon request by an applicant, and including data specific to this applicant. Although this may enhance the security of the applicant registration process, it may also increase the administrative workload for the issuer.

An instance of secret key exchange starts with the receipt of the first message 103, if any, and may proceed with the other steps of the applicant registration program 100 whenever triggered by the applicant. The execution of the other steps of the applicant registration program 100 is a controlled computer operation by the applicant. It is the applicant's digital processor that executes the applicant registration program 100.

An instance of secret key exchange includes, as part of the applicant registration program 100, the application of integrity mechanism 107 to recover public key 204 from scaled public key 203. This is the reversal of the said transformation that resulted in the "sealed public key" 203. As a consequence of this application of integrity mechanism 107, the applicant registration program 100 may abort the instance of secret key exchange. In cases where the integrity mechanism 107 is not used, the public key 204 is directly available to the applicant registration program 100 as part of the set of parameters.

In the case of DH-Harn, an instance of secret key exchange includes, as part of the applicant registration program 100, the verification of the Lein Harn intriguing digital signature, that is the verification that the numbers s and r from the first message 103 satisfy the appropriate verification equation. See the PKC specification table under the row heading "Verification of first message".

An instance of secret key exchange also includes, as part of the applicant registration program 100, the receipt of two inputs, respectively pass query 206 and pass reply 209, through keyboard input device 101. According to the spirit of the present invention, the applicant should choose unique and unrelated secret phrases for these two inputs. Without departing from the spirit of the present invention, the pass query 206 and pass reply 209 can be displayed by the applicant registration program 100 instead of being input from the input device 101. Then, randomness and secrecy should surround the generation of the pass query 206 and pass reply 209, to ensure a logical bind or link between this instance of secret key exchange and the displayed values for pass query 206 and pass reply 209.

An instance of secret key exchange also includes, as part of the hybrid public/secret key cryptographic processing 106, the local generation of an internal secret key according to the PKC in use. The random source 105 is used to generate at least one secret or private random number. See the PKC specification table under the row headings "Internal secret key" and "Length of internal key". With PK-Encr, the random source 105 directly produces the internal secret key. With DH-Harn, the random source 105 produces a private random number e and the internal secret key is computed as $r^e$ mod p. With PEKE, the random source 105 produces the secret random number $x_B$, and the internal secret key is computed from $x_B$, $x_{A \to B}$, S, C, N, t, and k. In the preferred embodiment, the size of the public key number N is 768 bits and the number k is about ⅓ of that size, hence k=256. The preferred embodiment for the random source 105 includes some pseudo-random number generator (PRNG) with state information. The said PRNG state information is stored on a computer hard disk, protected with the Frogbit data integrity algorithm, and varied (using available truly random data) both before and after the random source 105 usage in an instance of secret key exchange.

Still according to the PKC in use and as part of the hybrid public/secret key cryptographic processing 106, the applicant's digital processor prepares some components of the second message 104. See the PKC specification table under the row heading "Second message". With PK-Encr, this second message is the public key encryption of the internal secret key, using public key 204, the ciphertext being included in the second message 104. With DH-Harn, this is the computation of a number $f = a^e$ mod p where a and p were part of the set of parameters, according to the known art of the Diffie-Hellman cryptosystem, the number f being included in the second message 104. There is no signature generation from the applicant's digital processor; in other words the Lein Harn's improvement to the Diffie-Hellman cryptosystem is applied only for the issuer. As is well known in the prior art, the components of the second message 104 prepared in this way allow the issuer data processing center 300 to recover the internal secret key while protecting it from adversaries even if they can eavesdrop on the set of parameters, first message 103, and second message 104.

Without departing from the spirit of the present invention, other PKCs may be used for the local generation of the internal secret key. A likely candidate is any PKC that is a secret key establishment cryptosystem using a public key 204. For instance, the original Diffic-Hellman cryptosystem can be used directly with the same public key as for the DH-Harn improvement, in which case the internal secret key is computed as $y^e$ mod p, where e is generated by the random source 105, and y and p were part of the set of parameters.

According to the spirit of the present invention, another possible arrangement to obtain the internal secret key would rely on a public/private key 25 pair of the applicant that would not require certification as in the prior art public key cryptography. The presence of this public/private key pair of the applicant would make the random source 105 unnecessary. In this alternate scheme, the issuer public key 204 would be like in the PK-Encr case. The public component of the public/private key pair of the applicant would be encrypted using the issuer public key 204, and then transmitted to the issuer data processing centre 300 where it would be decrypted using the issuer private key 205. Still in the issuer data processing center 300, the function of the random source 105 would be performed, thus generating the internal secret key as if done by the applicant registration program 100 in the PK-Encr case. The internal secret key would then be encrypted using the public component of the public/private key pair of the applicant. The encrypted internal secret key would be sent back to the applicant registration program 100 where the knowledge of the private component of the public/private key pair of the applicant would allow decryption of the internal secret key. It should be clear to one skilled in the art that the confidentiality of the internal secret key is preserved if this instance of secret key establishment is thereafter successfully completed, as long as the private component of the public/private key pair of the applicant remains undisclosed, despite the fact that the issuer has no a-priori knowledge of the public component of the public/private key pair of the applicant.

Still according to the PKC in use and as part of the hybrid public/secret key cryptographic processing 106, the applicant's digital processor derives the secret key 201 from part or all of the internal secret key. This derivation may use any unambiguous specification, as long as it uses no input that is not shared with the issuer data processing center 300. For instance, a pseudo-random generator can be used as an "expander of randomness" if the secret key 201 is very large. In the preferred embodiment, the secret key 201 is simply a part of the internal secret key distinct from the two parts used respectively for the MAC and the DES encryption.

An instance of secret key exchange includes, as part of the hybrid public/secret key cryptographic processing 106, the cryptographic protection of pass query 206, pass reply 209, and possibly other data 108. This other data 108 may include a serial number of the portable memory device 102, the applicant's name, a conventional PIN (that is a secret PIN known by the applicant and stored in the issuer database) chosen by the applicant at the time of secret key establishment, and the like. This cryptographic protection is done with secret key cryptographic algorithms, possibly with the help of key-less hash functions. This cryptographic protection uses part or all of the internal secret key. For the pass query 206 and the pass reply 209, this cryptographic protection is confidentiality and data integrity protection. For the other data 108, this cryptographic protection may be what is deserved by a particular application. The result of this cryptographic protection is some ciphertext, and possibly some cleartext along with message authentication code, that goes into second message 104.

In the preferred embodiment, the cryptographic protection starts with the computation of a Message Authentication Code (MAC) of the pass query 206, the pass reply 209, and the other data 108 if any, using CBC-MAC with the DES algorithm, and using a first part of the internal secret key. Then, DES encryption with the CBC mode of operation is applied to the pass query 206, the pass reply 209, and any portion of the other data 108 that deserves confidentiality protection, using another part of the internal secret key. Thus, the data elements that go into second message 104 as a result of the cryptographic protection are 1) the ciphertext representation of the encrypted data, 2) the unencrypted portion, if any, of the other data 108, and 3) the calculated MAC.

An instance of secret key exchange also includes, as part of the applicant registration program 100, the loading of the secret key 201 into the portable memory device 102. This is done by key loader 109 that is any interface, connector, smartcard reader apparatus, operating system software driver needed to write data to the actual memory device in use. The key loader 109 may encompass intrinsic security functions such as requesting a PIN to unlock a smart card, or the key-splitting of secret key 201 into two or more parts.

In the preferred embodiment, the key loader 109 splits the secret key 201 into three parts as follows: the key loader 109 accepts a local applicant's PIN (that is not stored in the issuer database) through the keyboard input device 101, the first component is calculated as k1=hash(PIN) where "hash" is a key-less hash function; the key loader gets a component k2 from the random source 105; the third component is computed as k3=secret_key XOR k1 XOR k2 where secret_key is the secret key 201 and XOR is the exclusive-or operation. The key loader 109 loads the key component k2 into a Dallas Semiconductor DS1992 memory, and loads the key component k3 into a computer file on the local hard disk. This gives three-factor security: access to the secret key 201 requires 1) knowledge of the local applicant's PIN, 2) access to the Dallas Semiconductor DS1992 memory, and 3) access to the computer file.

An instance of secret key exchange also includes, as part of the applicant registration program 100, the sending of second message 104 to the issuer data processing center 300, through any ordinary data communications network. Once the second message 104 is received in the issuer data processing center 300, the reversed cryptographic processing 306 may be executed for the instance of secret key exchange characterized by the particular second message 104. The reversed cryptographic processing 306 is essentially the reversal of the hybrid public/secret key cryptographic processing 106. Even if it is a controlled computer operation by the issuer, it can be executed with minimal operator supervision, e.g. as an automated processing upon receipt of an e-mail message containing second message 104.

An instance of secret key exchange includes, as part of the reversed cryptographic processing 306, the reversal of the PKC in use, starting with the private key 205 and recovering the value of the said internal secret key. In the case of PEKE, it is possible for this instance of the secret key exchange to be aborted as a consequence of a suspected security breach detected during the reversal of the PKC in use. See the PKC specification table under the row heading "Verification of second message". With PK-Encr, the reversal of the PKC in use is the public key decryption of the ciphertext found in second message 104. Otherwise, see the PKC specification table under the row heading "Recovery of internal secret key".

From the internal secret key, the reversed cryptographic processing 306 derives the secret key 202, using the same procedures as the hybrid public/secret key cryptographic processing 106. The recovered secret key 202 is stored in the issuer database 303. The secret key status 305 is set to indicate that the verification of applicant's identity is yet to be done.

From the internal secret key, the reversed cryptographic processing 306 moreover reverses the cryptographic protections initially applied to pass query 206, pass reply 209, and possibly other data 108. It is possible for this instance of the secret key exchange to be aborted as a consequence of a suspected security breach detected in this reversal operation. The recovered and verified pass query 207 and pass reply 210 are stored in the issuer database 303.

Once the reversed cryptographic processing 306 is complete, the task of verifying the issuer's identity may be undertaken by an issuer's agent. To this end, a display means 301 provides the issuer's agent with the human readable form of the query 208, the human readable form of the reply 211, and some relevant applicant identification data. The display means 301 can be a computer screen or a printer. The issuer agent is also provided with an input means 302, possibly with visual feedback 304, with which the issuer agent may input a signal to update the secret key status 305. The update of the key status 305 may indicate successful verification of applicant's identity, and correspondingly the completion of this instance of secret key exchange according to the present invention. The update of the key status 305 may indicate the failure of this instance of secret key exchange. Since the verification of identity is critical for the bind between the secret key 202 and the applicant, the known art of data processing security should be applied to the provision of the human readable form of the query 208, the provision of the human readable form of the reply 211, and the acceptance of the update of the key status 305 through input means 302.

For some uses of the present invention, the computation load of public key cryptography may be a critical design issue, especially if the applicant's digital processor is a low power electronic device. When the PKC is PEKE, the prior art of Montgomery reduction may be applied advantageously in this respect. In this contemplated variant of the present invention, the applicant's processor would do the "modular reduction" operations "mod N" (and respectively "mod S") with the Montgomery algorithm described hereafter. This requires the pre-computation of some values, to be stored by the issuer in the said set of parameters. Let b be the natural computer word size of the applicant's processor, and n be such that $b^n > N$ (and respectively s such that $b^s > S$). The values to be pre-computed are $b^{2n}$ mod N (and respectively $b^{2s}$ mod S) and also $N_0'$ (and respectively $S_0'$) to be specified hereafter. Another advantageous change is to replace the PEKE equation $B_i = x_i$ mod $2^k$ by $B_i = ((x_i \times (b''))$ mod N) mod $2^k$, the latter being more quickly computed by the Montgomery algorithm.

Montgomery multiplication, in the multiple precision case as in the present invention, allows fast modular arithmetic for a modulus N relatively prime to $b^n$, where $b^n > N$, and arithmetic modulo b is easy (e.g. $2^{767} < N < 2^{768}$, N is odd, $b=2^8$, $n=96$, so $b=2^{768}$). Let $B=b^n$ (not to be confused with $B_i$, a notation proper to the PEKE specification). Given T satisfying $0 <= T <= B \times N$, the Montgomery reduction algorithm efficiently computes $T \times (B^{-1})$ mod N. Our focus is the modular multiplication, so let $T=x' \times y'$ where $x'=x \times B$ mod N and $y'=y \times B$ mod N; then the Montgomery reduction algorithm efficiently computes $x' \times y' \times (B^{-1})$ mod $N = x \times y \times B$ mod N.

Let us use the notation $M_{N,B}(X,Y)$ for the result of $X \times Y \times (B^{-1})$ mod N, using the Montgomery reduction algorithm. Then $x \times y \times B$ mod $N = M_{N,B}(x \times B$ mod $N, y \times B$ mod $N)$. To convert an integer x, $0 <= x < N$, into $x \times B$ mod N, compute $M_{N,B}(x, B^2$ mod $N)$. The value $B^2$ mod N should be pre-computed once and for all; this must be done with a general purpose division operation. To recover x from $x \times B$ mod N, compute $M_{N,B}(x \times B$ mod $N, 1)$. There are two routes to complete a single modular multiplication: $M_{N,B}(M_{N,B}(x,y), B^2$ mod $N) = x \times y$ mod N, or by pre-computing $x'=M_{N,B}(x, B^2$ mod $N)$ and $y'=M_{N,B}(y, B^2$ mod $N)$, and then $M_{N,B}(M_{N,B}(x', y'), 1) = x \times y$ mod N. Whenever a series of multiplications is performed on a same set of inputs or intermediate results, the latter route is more efficient. This is the case of the PEKE cryptosystem whenever the PEKE parameter t is greater than 1. Moreover, if the PEKE equation is changed as suggested above, the PEKE cryptosystem can be restated as $x'=M_{N,B}(x, B^2$ mod $N)$, $x_0'=M_{N,B}(x', x')$, $x_{i+1}'=M_{N,B}(x_i', x_i')$, and $B_{i=x_i}'$ mod $2^k$.

Now, the internals of the multiprecision Montgomery multiplication algorithm may be stated. There is a need for the value of integer N' such that $B \times (B^{-1}) - N \times N' = 1$, where $B \times (B^{-1})$ mod $N = 1$. Actually, only the least significant part of N' is needed, hence the definition $N_0'=N'$ mod b. We reproduce below the simple algorithm from the above-mentioned article by Dusse and Kaliski to efficiently find $N_0'$ from $N_0$ and b, when b is an exact power of two. Thus, $N_0'$ can be computed once and for all.

```
modular_inverse(N,b)
    Let k be such that b=2^k
    t := 1;
    for i←2 to k do
        if (N_0 × t mod 2^i) ≥ 2^(i-1)
            t := t+2^(i-1);
    return b - t;
```

In the multiprecision Montgomery multiplication algorithm that follows, capital letters are multi-precision variables. The indices are as expected for natural integers, e.g. No is the least significant part of N. The algorithm is an application of the convolution-sum method for the multiplication. The variable c is an accumulator with sufficient capacity for a sum of products and multiple carry bits from the additions (up to 2n of them).

```
M_{N,b,n}(X,Y)
    N_0' := b-(N_0^{-1} mod b);
    c := 0;
```

-continued

```
    for k←0 to n-1 do
        c := c+Σ_{0≤i≤k}(X_i × Y_{k-i} +Q_i × N_{k-i});
        c := c + X_k × Y_0
        Q_k := c × N_0' mod b;
        c := c    +Q_k×N_0;
        c := c/b;
    for k←0 to n-1 do
        c := c+Σ_{k<i<n}(X_i × Y_{n+k-i}+Q_i × N_{n+k-i});
        R_k := c mod b;
        c := ⌊c/b⌋;
    R_n := c;
    if R ≥ N then
        R := R-N;
    return R;
```

The variable $R_n$ is actually a local storage area of this algorithm (like Q and lower case variables). Consequently, the storage requirement for R is the same as for X and Y. Moreover, if X and Y are the same variable, as in the modular squaring operation of the PEKE cryptosystem, the storage for X, Y, and R can be the same.

I claim:

1. A method of establishing a secret cryptographic key shared between an applicant and an issuer comprising the steps of:

providing said applicant with a registration computer program means, said registration computer program means having a public key of said issuer and public key encryption capability;

generating said secret key using at least some random information at an applicant end;

generating a pass reply message using at least some arbitrary information at said applicant end;

encrypting said secret key and said pass reply using said public key to form at least one encryption message, said message including information allowing said issuer to identify said applicant;

sending said encryption message to said issuer by telecommunications means;

decrypting said encryption message at an issuer end to retrieve said secret key and said pass reply using a private key of said issuer;

receiving a second communication from said applicant at said issuer end separate from said encryption message over a channel that enables said issuer to ascertain said second communication to be genuinely from said applicant, said second communication containing said pass reply;

confirming a validity of said secret key at least with said issuer if said pass reply received during said second communication matches said pass reply decrypted, whereby said secret key may be confirmed for use in future transactions.

2. The method according to claim 1, wherein said step of confirming comprises displaying said pass reply decrypted to an agent at said issuer end.

3. The method according to claim 1, wherein said step of receiving a communication from said applicant comprises establishing telephonic communication with an agent at said issuer end and said applicant.

4. The method according to claim 3, further comprising a step of generating a pass query, wherein said step of encrypting comprises encrypting said pass query, said step of decrypting comprises decrypting said pass query, and further comprising a step of communicating said pass query to said applicant from said issuer end prior to receiving said pass reply in said communication, whereby said applicant is reassured that said issuer is genuine as a result of hearing said pass query, and feels safe to proceed with giving said pass reply.

5. The method according to claim 4, wherein said step of communicating comprises displaying said pass query decrypted to said agent.

6. The method according to claim 3, wherein said agent is provided with some personal indentification information about said applicant, said step of confirming further comprising said agent asking a personal identification question to said applicant and listening for a correct response.

7. The method according to claim 5, wherein said agent is provided with some personal indentification information about said applicant, said step of confirming further comprising said agent asking a personal identification question to said applicant and listening for a correct response.

8. The method according to claim 1, wherein said pass reply is input by said applicant.

9. The method according to claim 1, wherein said pass reply is displayed to said applicant.

10. The method according to claim 1, further comprising a step of selecting a personal identification number (PIN) for said applicant, wherein said step of encrypting further comprises encrypting said PIN, said step of decrypting further comprises decrypting said PIN, said PIN being stored at said issuer end for use in verification of future transactions.

11. The method according to claim 1, wherein said applicant possesses a smart card device and uses a smart card device interface connected to said program means, said secret key being loaded into said smart card device.

12. A method of applying for approval of a secret cryptographic key to be shared between an applicant and an issuer comprising the steps of:

obtaining a registration computer program means, said registration computer program means having a public key of said issuer and public key encryption capability;

generating said secret key using at least some random information;

generating a pass reply message using at least some arbitrary information;

encrypting said secret key and said pass reply using said public key to form at least one encryption message, said message including information allowing said issuer to identify said applicant;

sending said encryption message to said issuer by telecommunications means;

communicating said pass reply to said issuer end separately from said encryption message over a channel that enables said issuer to ascertain said pass reply to be genuinely from said applicant, said communication containing said pass reply.

13. The method according to claim 12, wherein said applicant possesses a smart card device and uses a smart card device interface connected to said program means, said secret key being loaded into said smart card device.

14. A method of approving a secret cryptographic key to be shared between an applicant and an issuer comprising the steps of:

receiving at least one encryption message from said applicant by telecommunications means, said message including an encryption of a secret key and a pass reply using public key encryption with a public key of said issuer, said message including information allowing said issuer to identify said applicant;;

decrypting said encryption message to retrieve said secret key and said pass reply using a private key of said issuer;

receiving a second communication from said applicant separate from said encryption message over a channel that enables said issuer to ascertain said second communication to be genuinely from said applicant, said second communication containing said pass reply;

confirming a validity of said secret key at least with said issuer if said pass reply received during said second communication matches said pass reply decrypted, whereby said secret key may be confirmed for use in future transactions.

15. A system for establishing a secret cryptographic key shared between an applicant and an issuer comprising:

applicant registration means having a public key of said issuer and public key encryption capability for generating said secret key using at least some random information at an applicant end, for generating a pass reply message using at least some arbitrary information at said applicant end, and for encrypting said secret key and said pass reply using said public key to form at least one encryption message, said message including information allowing said issuer to identify said applicant;

means for sending said encryption message to said issuer by telecommunications means;

means for decrypting said encryption message at an issuer end to retrieve said secret key and said pass reply using a private key of said issuer;

means for receiving a second communication from said applicant at said issuer end separate from said encryption message over a channel that enables said issuer to ascertain said second communication to be genuinely from said applicant, said second communication containing said pass reply;

means for confirming a validity of said secret key at least with said issuer if said pass reply received during said second communication matches said pass reply decrypted, whereby said secret key may be confirmed for use in future transactions.

* * * * *